March 20, 1934.        R. L. BLANCHARD        1,951,921
SPEED CONTROLLED DEVICE
Filed Nov. 10, 1930        2 Sheets-Sheet 1
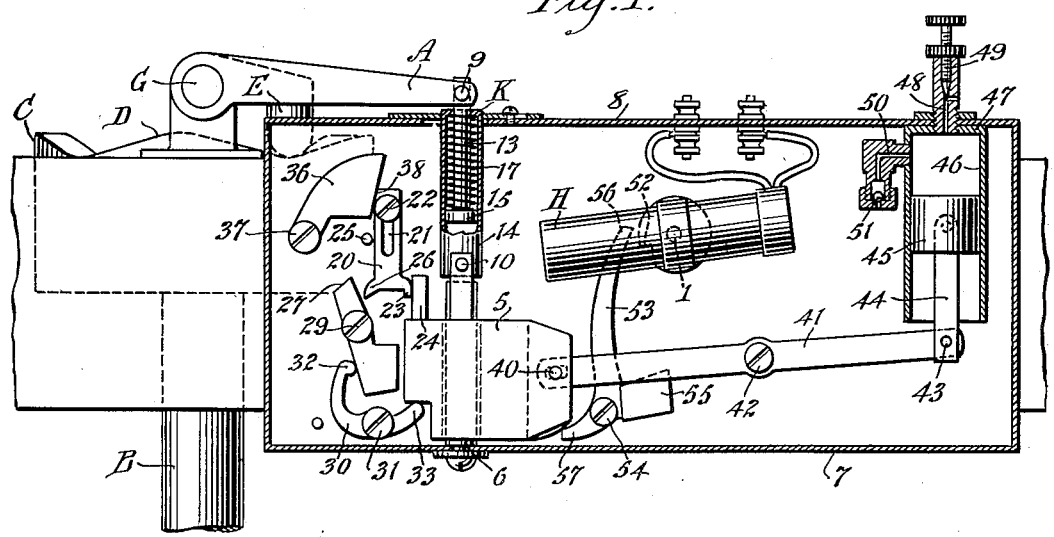
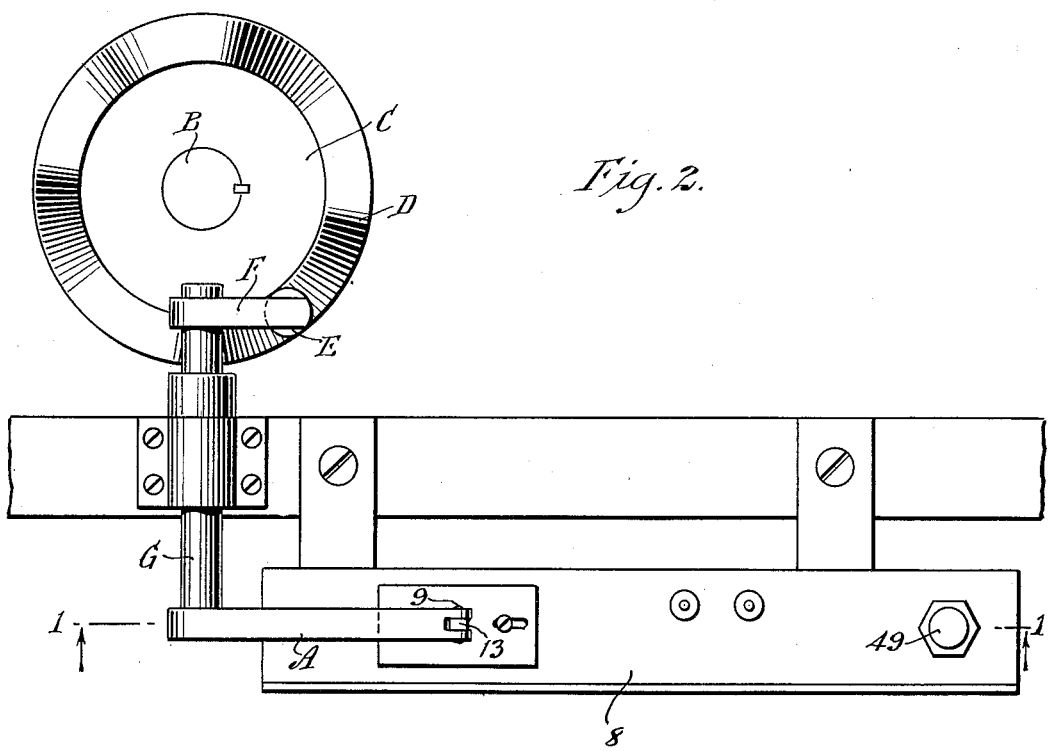
INVENTOR
Robert L. Blanchard
BY
ATTORNEY March 20, 1934.  R. L. BLANCHARD  1,951,921
SPEED CONTROLLED DEVICE
Filed Nov. 10, 1930  2 Sheets-Sheet 2
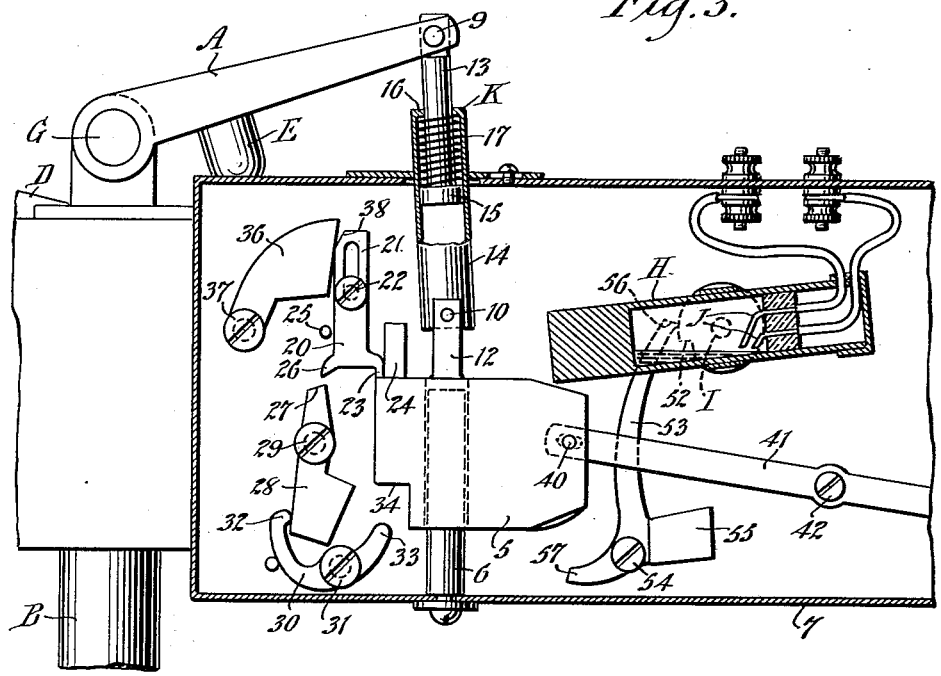
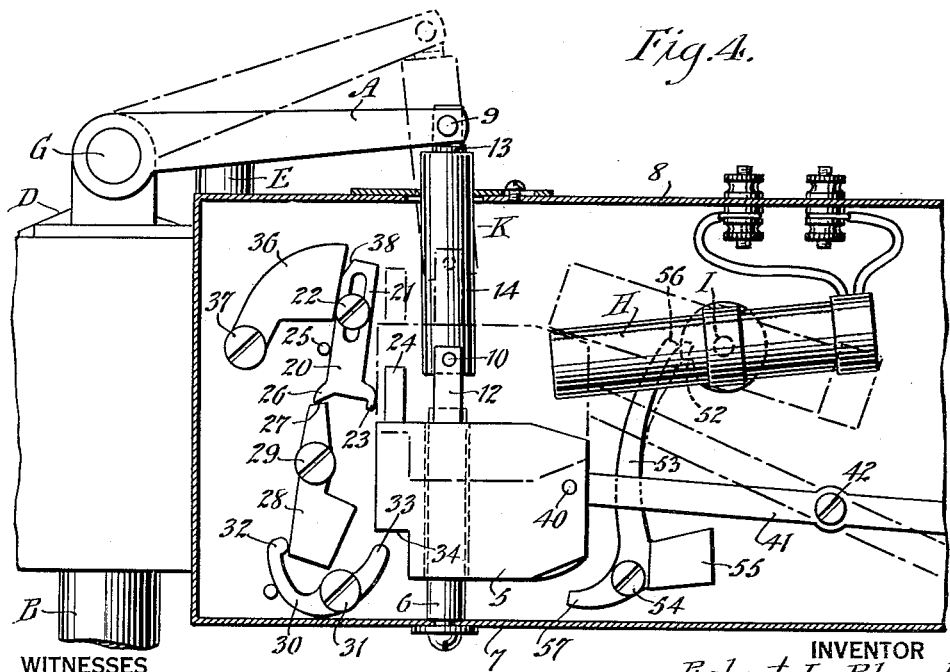
WITNESSES
Edw. Thorpe
Hugh H. Ott
INVENTOR
Robert L. Blanchard
BY
ATTORNEY Patented Mar. 20, 1934

1,951,921

UNITED STATES PATENT OFFICE 1,951,921

SPEED CONTROLLED DEVICE

Robert L. Blanchard, New York, N. Y., assignor to Van Kannel Revolving Door Company, New York, N. Y., a corporation of New Jersey Application November 10, 1930, Serial No. 494,795

11 Claims. (Cl. 192—138)

This invention relates generally to speed controlled devices, and has particular reference to a speed controlled switch or its equivalent, which may be employed for various purposes and which is particularly useful as a part of a speed regulating mechanism for revolving doors, such as set forth in my copending application, Serial No. 488,976, filed October 15, 1930.

In its broad aspect, the invention comprehends a mechanism which is responsive to the movement of a part which is moved at varying speeds and a controller adapted to be actuated by said mechanism when said part moves at a rate in excess of said predetermined speed.

The invention further resides in the provision of a speed controlled device in which a reciprocatory element acts when the reciprocations attain a predetermined speed, to cause a means to function and continue to function so long as said predetermined speed obtains, and which acts when the reciprocations fall below the said predetermined speed, to cause said means to cease to function.

More specifically, the invention contemplates in a mechanism of the indicated character and for the purpose specified, a positive stop for limiting the stroke of a reciprocating element in one direction and a dashpot operable upon movement of the element in the opposite direction at a predetermined speed, to retard the movement thereof and thereby shorten its stroke in said opposite direction whereby in so doing, the positive stop is disposed in an ineffective position and the reciprocatory element is permitted to move beyond the point normally limited by the stop for engaging and causing a means to function and continue to function until the speed is reduced below the said predetermined rate.

The invention furthermore comprehends in a speed controlled mechanism for actuating a controller, means for regulating said mechanism to vary the speed at which the controller will be actuated.

The invention furthermore aims to provide a mechanism of the indicated character which is comparatively simple in its construction and mode of operation, which is inexpensive to produce and which is highly efficient in its purpose.

With the above recited and other objects in view, reference is had to the following description and accompanying drawings, in which there is exhibited one example or embodiment of the invention, while the claims define the actual scope of the same.

In the drawings:

Figure 1 is a side view with parts shown in section, illustrating a speed controlled mechanism constructed in accordance with the invention.

Figure 2 is a plan view thereof.

Figure 3 is a fragmentary enlarged view similar to Figure 1, illustrating the different position of the parts.

Figure 4 is a similar view illustrating a further position of the parts.

Referring to the drawings by characters of reference, A designates a rock arm to which rocking motion is imparted by any means from any suitable source, such as by rotation of the shaft B of a revolving door, in which instance the shaft is provided with a member C keyed thereto having an undulating cam surface D which coacts with a terminal E of an arm F secured to the shaft or fulcrum G of the arm A. The controller or equivalent member H adapted to be actuated when the movement of the part or rock arm A exceeds a predetermined rate of speed, is herein illustrated as a conventional form of mercury switch which is fulcrumed on a horizontal axis I and is normally disposed in a tilted position to break or open an electrical circuit in which the spaced terminals J of the switch are included.

The mechanism for causing the actuation of the controller H when the part A exceeds a predetermined speed consists of a reciprocatory element or block 5, which in the present instance is disclosed as mounted and guided for vertical reciprocation on an upstanding guide 6 which is secured to the bottom wall 7 of a casing or housing 8. Reciprocations of the element or block 5 are effected through the medium of a link designated generally by the reference character K, which link is respectively fulcrumed at its opposite ends, as at 9 and 10, to the terminal of the rock arm and a lug 12 projecting upwardly from the element or block 5. The link K includes telescopically associated sections 13 and 14, the former being in the nature of a stem having an enlarged head 15 axially movable within the latter section 14, which is of tubular construction and which is provided with an apertured upper end 16 through which the stem 13 extends. A coiled expansion spring 17 is interposed between the upper end 16 of the section 14 and the head 15 of the stem 13. It thus follows that the downward stroke of the rock arm A permits the block or element 5 to gravitate downwardly, while the upward stroke of the rock arm A raises the block or element 5, thereby imparting vertical reciprocations to the block responsive to reciprocations of the arm A.

In order to provide means for limiting the upward movement of the block 5, a stop element 20 is disposed in its path of movement, and said stop element is mounted for vertical sliding and swinging movement by means of a slotted shank portion 21 through which screw or pin 22 extends. The stop element 20 is provided with a depending lug 23 which is normally disposed in a position to engage with the upper surface of the block 5, and which lug arrests or limits the upward movement of the block in the manner illustrated in Figure 3. An upstanding projection 24 on the block 5 prevents lateral swinging movement of the stop element 20 toward the right, while a pin 25 allows for a limited relative lateral swinging movement of the stop element 20 toward the left. The slotted shank portion 21 of the stop element 20 permits the same to move upwardly and downwardly a limited distance controlled by the length of the slot. The stop element 20 is further provided with an angular depending finger 26 which in certain instances is designed to coact with the beveled upper terminal 27 of a weighted cam element 28 which is fulcrumed as at 29 to normally dispose the beveled upper terminal 27 in the path of movement of the finger 26 when the cam element moves downwardly. A weighted detent member 30 is fulcrumed as at 31 and is provided with a terminal 32 which is designed to engage with the weighted cam member 28. The detent member 30 is provided with an opposite terminal 33 which is engageable by the notched surface 34 of the block 5 when the said block descends to the lower limit of its movement, whereby the detent element 30 acts to swing the weighted cam member 28 for disposing the beveled upper terminal 27 out of the path of movement of the stop element finger 26. A weight member 36 fulcrumed at 37 normally gravitates against the side of the shank 21 of the stop element 20 and coacts with the upper beveled corner 38 of said shank portion to maintain the axis of the stop element vertical under normal conditions when said stop element is at the lower limit of its movement. In practice, the normally lower end of the tilted controller or switch H will be disposed above the block 5 in a position where said block is prevented from contacting therewith when the stop element is in a position to limit the upward movement of the block. The block or element 5 has connected thereto by a pin slot connection 40, one end of a lever 41 which is fulcrumed as at 42, the opposite end being pivotally connected as at 43 to the stem 44 of a plunger 45 mounted for reciprocation in a cylinder 46. The cylinder 46 is provided with a closed upper end or member 47 having a fluid or air passage 48 controlled by a needle valve 49. The upper end of the cylinder is also provided with an intake passage 50 controlled by an inwardly opening downwardly closing check valve 51. The plunger and cylinder constitute a dashpot which acts upon the block 5 through the medium of the lever connection 41, it being understood that the fluid or air passages 48 and 50 are of sufficient size to permit of an unrestricted downward movement of the plunger and a restricted upward movement of the plunger when the same is moved in excess of a predetermined rate of speed.

The controller or switch is provided with means which is operable to hold the same in a tilted active position to close the circuit, which in the present instance is illustrated as a toothed member 52 and a dog or pawl 53 which is fulcrumed as at 54 and weighted as at 55 so that the terminal 56 of the dog is normally swung to engage the periphery of the toothed disk 52. The dog is provided with an actuating terminal 57 which is disposed in the path of movement of the block 5.

In use and operation of the device, when the rock arm A is rocked at what will be termed a normal rate of speed below a predetermined maximum, the block 5 will be reciprocated vertically in response thereto without any check or retarding action by the dashpot. These normal reciprocations of the block will result in the limiting of the upward movement by the stop element so that the block will not engage with the controller or switch H. In other words, the block 5 will move from the uppermost position illustrated in Figure 3 to the lowermost position illustrated in Figure 1, and vice versa, freely so long as the rock arm A travels at the normal rate of speed below the predetermined maximum. Each downward movement of the block 5 will cause the notched portion 34 to engage with the terminal 33 of the detent 30 so that the terminal 32 thereof swings the weighted cam 28 to the position illustrated in Figure 1, whereby the upper beveled terminal 27 of said cam member is disposed out of the path of downward movement of the finger 26. As the block moves upwardly from its lowermost position it engages with the depending lug 23 of the stop member 20 and lifts the stop member until the lower end of its slotted shank portion 21 engages the screw or pin 22. Obviously, due to the spring 17, the rock arm may continue to move upwardly to the full extent of its stroke by compressing the spring 17. The next downward movement or stroke of the rock arm will permit the block to gravitate freely downward, and these operations are repeated so long as the speed of the rock arm is normal and below the predetermined maximum. In event the speed of the rock arm exceeds the predetermined maximum and permits the block 5 to gravitate downwardly faster than normal speed, the dashpot will retard the downward movement of the block 5 so that said block 5 will not be permitted to reach the downward extent of its movement before it is lifted again by the upward movement of the rock arm. This will result in the failure of the notched portion 34 to contact with the terminal 33 of the weighted detent 30. Obviously, this will hence prevent the terminal 32 from swinging the weighted cam member 28 to an inactive position so that the beveled upper terminal 27 will engage with the finger 26 and swing or cam the stop member 20 to the position illustrated in Figure 4. The swinging of the stop member 20 laterally to the canted or angular position shown in Figure 4 will dispose the lug 23 out of the path of movement of the upper surface of the block 5 and will permit the link K to move the block upwardly beyond the point where it stops under normal speeds, so that the block engages with the lower end of the tilted controller or switch H, whereby the switch is rendered active to close the circuit. At the same time, the weighted dog or pawl 53 will be swung to engage its terminal 56 with the toothed disk 52, thereby retaining the switch in its active circuit closing position, and the switch will so remain as long as the speed exceeds the predetermined maximum, for the reason that the down stroke of the block 5 will be limited approximately to the position shown in Figure 4, where it will not contact with the actuating terminal 57. When the speed of the rock arm and corresponding speed of reciprocations of the block 5 fall below the predetermined maximum, the dashpot obviously will permit the block 5 to descend to the lowermost limit of its position, where it will move the weighted cam member 28 and permit the stop element 20 to swing to its vertical position to limit the upward movement to the position of the block illustrated in Figure 3. At the same time, the downward movement of the block to its fullest extent will engage with the actuating terminal 57 of the dog and release the same to allow the switch or controller H to gravitate to its normal position.

From the foregoing, it will thus be seen that a mechanism has been devised which is responsive to the movement of a movable part which travels at varying rates of speed, for causing the actuation of a controller or equivalent member when said movable part exceeds a set or predetermined maximum speed. Obviously, by means of the needle valve 49, the maximum speed may be varied in accordance with the will of the user.

What is claimed is:

1. A device for limiting the speed of rotation of a revolving member to a predetermined maximum, a driven reciprocatory element receiving its motion from and limiting the speed of said member by the extent of its movement, means functioning when the reciprocations of said element are below a predetermined rate of speed to limit the extent of the reciprocations in one direction and thereby allow free revolving movement of said member, and means including said first means and functioning together therewith to cause said reciprocations to extend beyond said limit when the reciprocations equal or exceed said predetermined rate of speed to thereby limit the rate of speed of said revolving member to said predetermined maximum.

2. A device for limiting the speed of rotation of a revolving member to a predetermined maximum, a reciprocatory element receiving its motion from and limiting the speed of said member by the extent of its movement, means including a stop member functioning when the reciprocations of said element are below a predetermined rate of speed to limit the extent of reciprocations of said element in one direction and thereby allow free revolving movement of said member, and means including said first means and functioning together therewith to cause said reciprocations to extend beyond said limit when the reciprocations equal or exceed said predetermined rate of speed to thereby limit the rate of speed of said revolving member to said predetermined maximum.

3. A device for limiting the speed of rotation of a revolving member to a predetermined maximum, a reciprocatory element receiving the speed of said member by the extent of its movement, means including a stop member functioning when the reciprocations of said element are below a predetermined rate of speed to limit the extent of reciprocations of said element in one direction and thereby allow free revolving movement of said member, and fluid-controlled means cooperating with said first means and functioning together therewith to cause said reciprocations to extend beyond said limit when the reciprocations equal or exceed said predetermined rate of speed to thereby limit the rate of speed of said revolving member to said predetermined maximum.

4. A device for limiting the speed of rotation of a revolving member to a predetermined maximum, a reciprocatory element receiving its motion from and limiting the speed of said member by the extent of its movement, means including a stop member functioning when the reciprocations of said element are below a predetermined rate of speed to limit the extent of reciprocations of said element in one direction and thereby allow free revolving movement of said member, and a pneumatic dash pot cooperating with said first means and functioning together therewith to cause said reciprocations to extend beyond said limit when the reciprocations equal or exceed said predetermined rate of speed to thereby limit the rate of speed of said revolving member to said predetermined maximum.

5. In a mechanism of the character set forth, a driven reciprocatory element, a positive stop for limiting the stroke of said element in one direction, a movable stop for limiting the stroke of said element in the opposite direction, means for causing said movable stop to be disposed in the path of movement of the element when said element travels its full distance towards the positive stop and means operable when said element is driven at or exceeds a predetermined rate of speed to retard the stroke of the element toward said positive stop whereby to cause said movable stop to be moved out of the path of said element to extend its stroke beyond the limit set by the movable stop.

6. In combination, a movable part which moves at varying speeds, a device adapted to be actuated when the movement of said part exceeds said predetermined speed and a mechanism responsive to the movement of said part for causing the actuation of said device when said part exceeds said predetermined speed, said mechanism including a reciprocatory element operatively connected with and movable by said part between definite limits when said part is moving at a rate below said predetermined speed and means operable when said part exceeds said predetermined rate of speed, for causing said element to vary its limits to actuate the device to be actuated.

7. In combination, a movable part which moves at varying speeds, a device adapted to be actuated when the movement of said part exceeds prdetermined speed and a mechanism responsive to the movement of said part for causing the actuation of said device when said part exceeds said predetermined speed, said mechanism including a reciprocatory element operatively connected with and movable by said part between definite limits when said part is moving at a rate below said predetermined speed and means operable when said part exceeds said predetermined rate of speed, for causing said element to vary its limits to actuate the device to be actuated and to maintain said device active until the rate of speed of the moving part is reduced below said predetermined maximum.

8. In combination, a movable part which moves at varying speeds, a device adapted to be actuated when the movement of said part exceeds said predetermined speed and a mechanism including a reciprocatory element operatively connected with and movable by said part between definite limits when said part is moving at a rate below said predetermined speed and means operable when said part exceeds said predetermined rate of speed, for causing said element to vary its limits to actuate the device to be actuated, said means consisting of a movable stop member normally disposed in the path of movement of the reciprocatory element to prevent movement of said element in a direction beyond a certain limit, beyond which it will contact with and actuate the device to be actuated, means operable by contact of the reciprocatory element therewith, upon movement of the element in the other direction to its normal limit, for causing the stop member to be disposed in its normal position in the path of said element, and means operable upon movement of the element in said opposite direction at a rate of speed in excess of the predetermined rate, for retarding the movement of the element to shorten its stroke in said opposite direction whereby the reciprocatory element fails to contact with the means for causing the stop member to be disposed in the path of said element and hence permits said element to move beyond the normal limit, whereby the said element engages with and actuates the device to be actuated.

9. In combination, a movable part which moves at varying speeds, a device adapted to be actuated when the movement of said part exceeds said predetermined speed and a mechanism responsive to the movement of said part for causing the actuation of said device when said part exceeds said predetermined speed, said mechanism including an element mounted for vertical reciprocation, a connection between said element and said movable part consisting of a tensioned link for lifting said part and for permitting a gravitational lowering of the same, a movable stop member normally disposed in the path of upward movement of said element, a positive stop for limiting the downward movement of said element, means operable by and upon downward movement of said element to the limit of its downward movement for causing said movable stop to be disposed in the path of upward movement of said element and means operable upon downward movement of said element in excess of a predetermined rate of speed, for shortening the downward stroke thereof whereby the movable stop is disposed out of the path of upward movement of the element as and for the purpose specified.

10. In combination, a movable part which moves at varying speeds, a device adapted to be actuated when the movement of said part exceeds said predetermined speed and a mechanism responsive to the movement of said part for causing the actuation of said device when said part exceeds said predetermined speed, said mechanism including an element mounted for vertical reciprocation, a connection between said element and said movable part consisting of a tensioned link for lifting said part and for permitting a gravitational lowering of the same, a movable stop member normally disposed in the path of upward movement of said element, a positive stop for limiting the downward movement of said element, means operable by and upon downward movement of said element to the limit of its downward movement for causing said movable stop to be disposed in the path of upward movement of said element and means operable upon downward movement of said element in excess of a predetermined rate of speed, for shortening the downward stroke thereof whereby the movable stop is disposed out of the path of upward movement of the element in combination with a device to be actuated by said reciprocatory element disposed in the path of movement thereof above the point limited by the movable stop.

11. In combination, a movable part which moves at varying speeds, a device adapted to be actuated when the movement of said part exceeds said predetermined speed and a mechanism including an element mounted for vertical reciprocation, a connection between said element and said movable part consisting of a tensioned link for lifting said part and for permitting a gravitational lowering of the same, a movable stop member normally disposed in the path of upward movement of said element, a positive stop for limiting the downward movement of said element, means operable by and upon downward movement of said element to the limit of its downward movement for causing said movable stop to be disposed in the path of upward movement of said element and means operable upon downward movement of said element in excess of a predetermined rate of speed, for shortening the downward stroke thereof whereby the movable stop is disposed out of the path of upward movement of the element in combination with a device to be actuated by said reciprocatory element disposed in the path of movement thereof above the point limited by the movable stop, means for retaining said device in a shifted position caused by the engagement of said reciprocatory element and means for releasing said retaining means engageable by said reciprocatory element when it moves downwardly to the full extent of its stroke.

ROBERT L. BLANCHARD.